Feb. 10, 1953  F. M. DARNER ET AL  2,627,969
APPARATUS FOR ADVANCING PLATE MATERIAL
Filed June 14, 1949  2 SHEETS—SHEET 1

INVENTORS
Frederic M. Darner
BY Roy E. Brakeman

Robert S. Dunham
ATTORNEY

Feb. 10, 1953

F. M. DARNER ET AL 2,627,969

APPARATUS FOR ADVANCING PLATE MATERIAL

Filed June 14, 1949

INVENTOR.
Frederic M. Darner
Roy E. Brakeman
BY

Robert S. Dunham
ATTORNEY

Patented Feb. 10, 1953

2,627,969

UNITED STATES PATENT OFFICE 2,627,969

APPARATUS FOR ADVANCING PLATE MATERIAL

Frederic M. Darner, Shaker Heights, Ohio, and Roy E. Brakeman, Gadsden, Ala., assignors to Republic Steel Corporation, Cleveland, Ohio, a corporation of New Jersey Application June 14, 1949, Serial No. 99,104

8 Claims. (Cl. 198—127)

This invention relates to apparatus for advancing plate material, viz. relatively rigid plate, skelp or similar plate-like sheet, which is to be transferred along a predetermined course from one locality to another, the apparatus being particularly designed for driving or conveying steel plates, i. e. heavy, rigid sheets, of relatively large dimensions, along a horizontal path, as in plants, mills or the like, where such articles are to be conveyed from one place to another in the course of manufacture, processing, shaping or other handling. In a particularly important and presently preferred aspect, the apparatus has been applied to the advance of skelp through successive operations in a pipe mill, for instance, relatively rigid plate-like sheets (herein conveniently defined as plates), which must traverse certain preliminary apparatus, including devices for preliminary shaping operations, and which are ultimately to be formed into tubular blanks and thereafter welded to constitute pipe. Such skelp, representing plates of the order of 30 feet long and 7 to 9 feet in width and having a gauge of $\frac{3}{16}$ to $\frac{1}{2}$ inch, are heavy, cumbersome articles, which may weigh from $\frac{1}{2}$ to 2 tons or more and which must nevertheless be advanced flatwise, say in the direction of their longer dimension, through various working stages. Heretofore, a common means for conveying such plate-like articles has involved a multiplicity of parallel rollers appropriately geared, chain-driven or otherwise connected for positive, synchronized drive to advance the plates resting upon them; but such equipment has been complex and costly, to the disadvantage of true efficiency in production.

An important object of the present invention is to provide novel and improved advancing means for articles of the character described, effective to transfer or drive such articles along a predetermined path and yet simpler and more economical in construction than apparatus heretofore available.

A further object is to provide such advancing or plate driving means, which is highly efficient and reliable and yet which obviates cumbersome arrangements of positively driven, and synchronized, multiple rollers.

A further object is to provide plate advancing means of novel and improved character having effective adjustment or steering features and including cooperating instrumentalities to maintain the apparatus in driving relation to the plate. Yet another object is to provide apparatus of the character described having novel control and adjusting means relative to its engagement with a plate or the like to be advanced and relative to its operation in effecting such advancement. Additional objects are to afford improved and simplified conveyor or traction driving means of the character described, appropriately cooperative with such other handling or processing equipment as may be located at the ends of the path of travel of the conveyed articles.

To these and other ends, one presently preferred embodiment of the invention is shown in the accompanying drawings and explained below, by way of example, to illustrate the features and principles of improvement.

Referring to the drawings.

Figure 1:
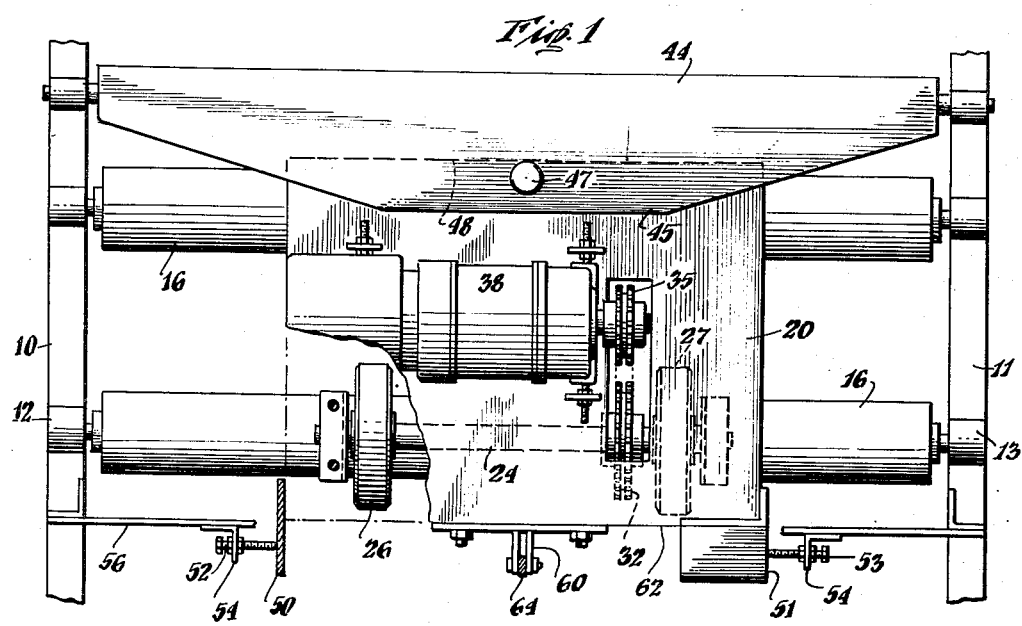
Fig. 1 is a plan view, with certain parts broken away, of advancing and conveying apparatus embodying the invention.

As indicated hereinabove, the illustrated embodiment is intended for use in advancing successive articles of plate-like character, such as skelp for the manufacture of large diameter pipe, along a predetermined path. Referring to the drawings, such path may be defined by a frame structure including horizontal portions 10, 11, extending longitudinally of the path at each side and carrying bearings 12, 13 for journalling a multiplicity of conveyor rolls 16 which are thus arranged in a spaced array lengthwise of the path and parallel to each other, to constitute a pathway for rolling travel of a plate such as the illustrated skelp 18, successive such articles being designated 18a and 18b in Fig. 4. The long cylindrical rollers 16 are all simply of idling nature, i. e. in that they are mounted for free rotation, on parallel axes along the path and have no driving connections whatever.

A platform 20 or like supporting device is disposed above and parallel to the pathway constituted by the rollers 16, and carries, conveniently depending therefrom, a pair of bearings 22, 23 spaced crosswise of the path. A shaft 24, thus parallel to the rollers 16, is journalled in the bearings 22, 23 and carries a pair of spaced rollers 26, 27, each of which is provided with a solid rubber tire 30 or like resilient or elastic tread, to engage the upper surface of the plate 18 that is supported on the rollers 16. While in some cases a single roller 26 or 27, or several such rollers may be employed, i. e. on a shaft transverse of the path of plate advance as shown, particularly effective results have been achieved with a pair of rollers spaced substantially apart (e. g. by a distance at least about ¼ and preferably about ⅓ of the width of the path) and disposed centrally in the manner indicated.

The shaft 24 carries a sprocket 32, for drive by the chain 34 from a sprocket 35 on the shaft 36 of a motor drive unit 38 conveniently mounted on the upper surface of the platform 20, the motor drive unit being a suitable device of known construction, such as an electric motor or gear transmission unit, adapted to turn the shaft 24, through the instrumentalities described, at an appropriate rate selected from a range (say, of 10 to 100 R. P. M.) for the desired advance of the plate 18 along the pathway.

Figure 3:
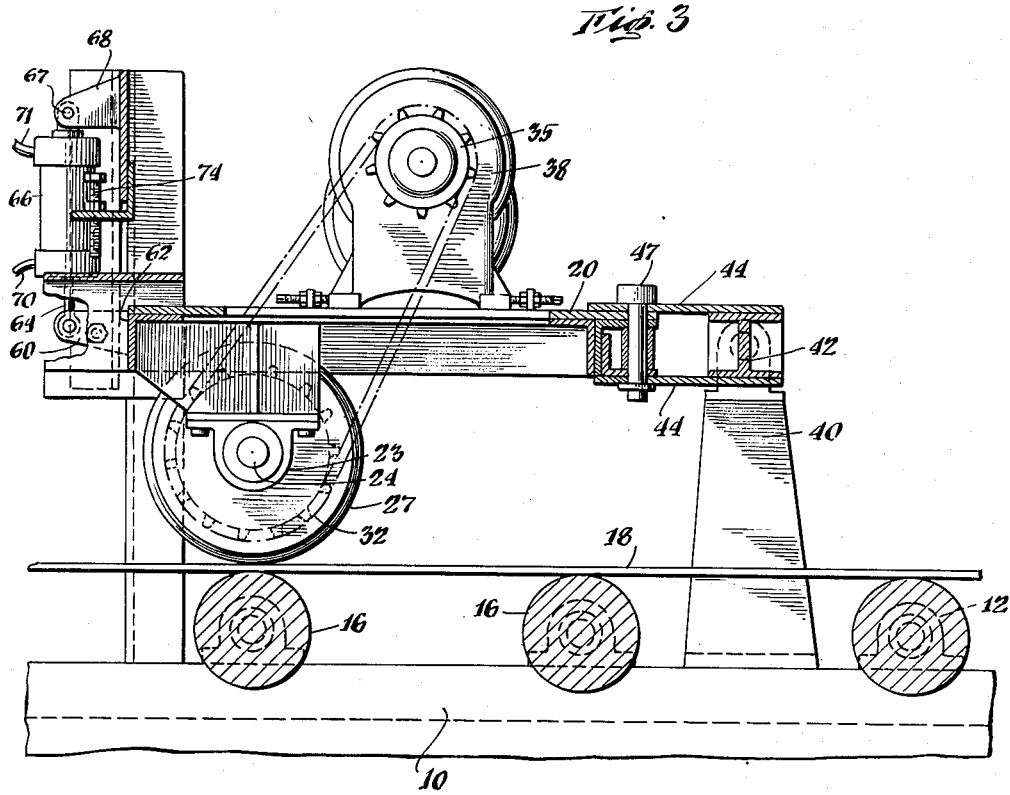
Fig. 3 is a side elevation, with certain parts in section on a central, vertical plane.

Further stationary structure carried on or with the frame constituted by the members 10, 11, includes upright means indicated at 40 in Fig. 3 to mount a beam 42 which extends across the pathway at an elevated position, e. g. at the level of the platform 20. A pair of horizontal plates 44, 44 are carried on the respectively upper and lower faces of the beam, having a central portion 45 which projects into overlapping relation to the platform 20 at the upper and lower surfaces of the latter. A vertical pivot pin 47 traverses vertically registered openings in the plates 44 and the platform 20, in such fashion that the platform is supported, by the spaced plates 44, at a central region of the transverse edge 48 of the platform, thereby permitting angular displacement of the platform and its associated instrumentalities about the vertical axis of the pin 47.

The pivoted connection thus constituted between the side of the platform and the trunnion plates 44 at the pin 47 may conveniently have some looseness of fit in a direction longitudinal of the pathway, i. e. lengthwise of the advance of the plates 18 (and also, to a slight extent, vertically) so as to permit a small angular displacement of the platform 20 about a horizontal axis which extends crosswise of the path at the pivot locality.

Near the other end or transverse edge of the platform and respectively disposed at the sides of the latter, are a pair of plates 50, 51, arranged to be engaged respectively by stop members 52, 53, which are in fact bolts carried in arms 54, 54, depending from a transverse beam 56 that constitutes another part of the stationary supporting structure, i. e. likewise extending across the pathway of rollers 16 and spaced above the latter as shown. It will be noted that by appropriately turning the pairs of the nuts 58, 59, on the stop screws 52, 53, the screws may be adjusted in position and then locked located in the desired position of adjustment, i. e. in a direction crosswise of the conveyor path. Thus in cooperation with the pivotal mounting 47, the rollers 26, 27 may be accurately aligned to feed or drive the plate 18 in the desired direction, for example, exactly perpendicular to the axes of the rollers 16; or in some cases, if desired, some play or caster action may be permitted in the assembly constituted by the platform 20, i. e. by leaving appropriate clearance between the screws 52, 53 and the attendant plates 50, 51. Ordinarily, to permit the vertical adjustment or displacements described below, the screws 52, 53 are positioned without substantial pressure on the plates 50, 51, i. e. so that the latter, and thus the platform 20, may slide relative to the ends of the screws.

A yoke 60 extending from an end edge 62 of the platform 20 opposite to the edge 48, is pivoted to the end of a vertical piston rod 64 that extends to a piston (not shown) in a cylinder 66 which at its upper end is pivotally mounted at 67 in a yoke 68 carried by the beam 56. The cylinder 66 is adapted to be energized by appropriate fluid under pressure, for exertion of displacing force vertically on the piston rod 64. While water, oil or other liquid may in some cases be used, gaseous fluid is at present preferred, such as compressed air, which may be supplied to the cylinder in the usual manner, as through the conduits 70, 71 at opposite ends of the cylinder. The cylinder 66 is conveniently of double-acting type, i. e. adapted to exert positive force upon its piston under appropriate control, in either direction. Adjustable stop screws 73, 74 projecting downwardly from the beam 56 are disposed to limit upward movement of the platform at a desired, adjusted position, by engagement of the screws with spaced horizontal plates 75, 76 adjacent the corners of the platform end 62. As noted, the stop screws 73, 74 are normally adjusted to provide considerable clearance and thus to permit reasonable upward displacement of the assembly at all times.

In operation, the motor unit 38 may be energized to run continuously and thus to turn the rollers or wheels 27 continuously at a predetermined, fixed speed, such speed being at least approximately correlated with the rate of rotation or drive of such rollers or like instrumentalities as may be embodied at the ends of the path of travel of the plates 18, i. e. in the equipment from and to which the illustrated traction drive device is adapted to transfer such plates. Ordinarily, the drive unit 38 may be rather accurately correlated in speed with such instrumentalities, as by electrical or governor control but without intermediate mechanical connection to the other devices.

While for some purposes, the illustrated assembly may be permitted to depend freely at all times from its supporting location at the pivot 47, i. e. so that the rollers 26, 27 tend to engage the immediately adjacent roller 16 disposed perpendicularly below them, i. e. in rolling contact (the rollers 26, 27 then, through their resilient surfaces 30, exerting advancing force on a plate 18 as and when the same is brought to the line of contact between the rollers 26, 27 and the adjacent roller 16), controlled operation by virtue of the cylinder 66 is more usually preferred. That is to say, the cylinder 66 may be actuated to elevate the corresponding end 62 of the platform 20 and to keep the same elevated when no plate or like article 18 is to be passed along the rollers 16 of the pathway. Upon the advance of such plate to a position where its leading edge (for instance traveling from right to left as indicated in Fig. 3, or from left to right as in Fig. 4) has passed the lowermost point of the rollers 26, 27, the cylinder 66 may be actuated in a reverse direction, i. e. to drive its piston rod 64 downwardly and thus to urge the platform 20 and rollers 26, 27 downward for confirming, compressive engagement of the rubber surfaces 30 with the upper face of the plate 18. Since the rollers are continuously turning, they immediately exert advancing force on the plate, and by virtue of their firm frictional grip through the rubber surfaces (and thus despite a smooth, or even polished, surface which the plate may have), positively drive the plate in the intended direction along the pathway.

Figure 2:
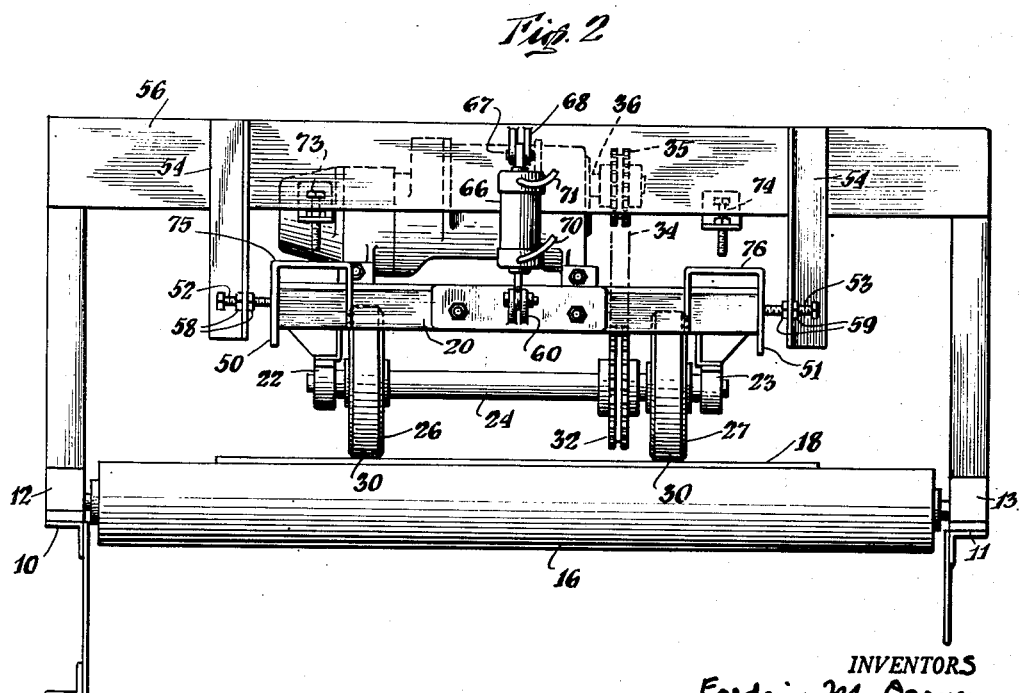
Fig. 2 is an end elevation of the apparatus of Fig. 1.
Figure 4:
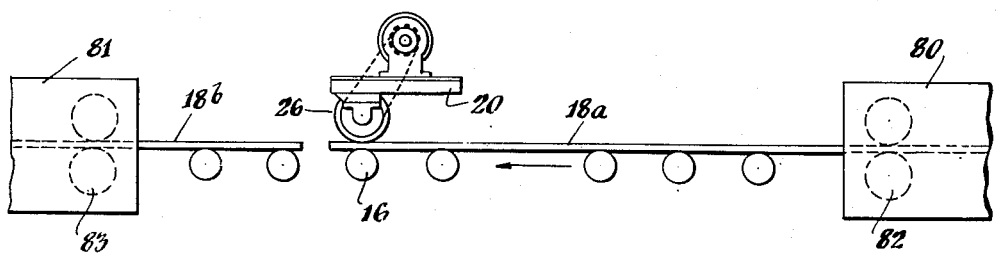
Fig. 4 is a schematic side elevation, showing one manner in which the apparatus may be operatively associated with other elements of equipment between which articles are to be conveyed.

As shown, for example, in Fig. 4, successive plates may be desired to be advanced from an apparatus 80 (such as a shear or like equipment for trimming edges of the plates) to another apparatus 81, wherein for example a preliminary longitudinal shaping operation may be performed. The respective devices 80 and 81 each include some arrangement of advancing rollers respectively designated 82, 83. While a plate 18a is passing through the device 80, the platform 20 may be elevated, as by means shown in Figs. 1 to 3 with the roller 26 (and the roller 27) lifted from the pathway. As the device 80 delivers the sheet 18a to a point beyond the roller 26, the platform 20 may be lowered, by manual or automatic control as desired, bringing the rollers in to operative engagement with the upper surface of the sheet, and thereby taking over the drive of the plate-like sheet along the rollers 16 in the direction indicated. When the sheet 18a has advanced to a position for engagement in the device 81, as by its rollers 83, the platform 20 may be again elevated, relieving the sheet of drive by the roller 26 and permitting the plate to continue advance under the operation of the apparatus 81, i. e. as indicated at 18b in Fig. 4.

Not only does the cylinder 66 with its associated instrumentalities, serve to provide displacement of the assembly to and from operative position, but it further affords a resilient mounting for the platform 20 and the rollers 26, 27. That is to say, under any projecting irregularity or elevated contour or other non-uniformity of the plate 18, such as might otherwise tend to jam or even to damage the roller driving assembly, the cylinder 66 will yield under the superior force, permitting the rollers 26, 27 to rise as necessary over the irregularity or the like. Indeed by the illustrated mounting of the platform, only at the two points represented by the pivot 47 and the yoke 60, the assembly may rock to any slight extent necessary, about a line connecting these points, so as to ride over any irregularity which affects one of the rollers but not the other. Similarly upon any depression in the surface of the plate or skelp 18, the continuing force exerted by the cylinder 66 will carry one or both of the rollers further downward to the extent necessary to keep both of them in full, driving engagement with the smooth plate surface.

As noted above, the stop plates 50, 51 and associated stop screws 52, 53 are arranged and preferably so adjusted as to permit these vertical motions, yet without misalignment of the platform and rollers angularly about the pivot axis 47, i. e. the rollers being maintained in the desired, precisely adjusted position for advance of the plate along the pathway. While it is ordinarily preferred that the apparatus be arranged and disposed so that one of the idler rollers 16 is located immediately below the rollers 26, 27, i. e. for better grip of the plate 18, as well as to arrest the assembly against inadvertent or undesired downward displacement when a plate is absent, it will be appreciated that in some cases apparatus of the character shown may be employed with the pathway rollers otherwise arranged, i. e. without having one of them precisely beneath the rollers 26, 27.

As will now be understood, the device provides an efficient and powerful drive of the plate 18 along the pathway, i. e. in combination with the idler rollers constituting the latter. At the same time, no complex arrangement of synchronized or other positive drive for the pathway rollers is required, the arrangement thus avoiding all initial and upkeep cost of such equipment. Particularly by virtue of the resilient-surfaced tread of the roller means, the upper face of the plate is firmly and positively engaged, under pressure which may be regulated to any desired value, as by adjustment of the fluid pressure maintained in the cylinder 66. In operation, the apparatus has been found highly effective, for transfer of heavy plates and like rigid articles of the character described, it being noted that the device can as well be used with partially made or deformed articles (such as skelp having partly turned or bent longitudinal edges), which may all be generically comprehended herein by reference simply to the term, plates.

It is to be understood that the invention is not limited to the specific apparatus herein shown and described but may be carried out in other forms without departure from its spirit.

What is claimed is:

1. In apparatus for advancing plate material and the like, in combination, an array of spaced, parallel, idling rollers, arranged to provide a supporting path upon which a plate may roll, said path extending transversely of the axes of the rollers, resiliently-tired roller means, means mounting said roller means above said path and with its axis substantially parallel with the axes of the rollers, for engaging the upper surface of a plate disposed on the rollers, means for driving said roller means, to advance the plate along the path, and adjustable positioning means for the roller means, including means pivotally mounting said mounting means on a vertical axis and adjustable retaining means for the mounting means, for selectably limiting the angular position of the roller means relative to said vertical axis.

2. In apparatus for advancing plate material and the like, in combination, roller means distributed along a predetermined path, to constitute a pathway for rolling travel of a plate, said roller means comprising a plurality of roller elements and means mounting the same for idling rotation on axes transverse of the path, a roller, means mounting said roller above said roller means, for rotation on an axis transverse of the path, and in rolling engagement with the upper surface of a plate carried on the roller means, said second-mentioned mounting means being vertically movable relative to the pathway, means for driving said roller, to advance the plate along said pathway, and fluid-pressure energized means for selectively raising and lowering said second-mentioned mounting means to lift the roller from and to depress it upon the plate carried on the roller means, said fluid-pressure energized means relievably urging the roller against the upper surface of the plate when the roller is depressed upon said plate.

3. In apparatus for advancing plate material and the like, in combination, an array of spaced, parallel idling rollers, arranged to provide a supporting path for rolling travel of a plate, resiliently-tired roller means, supporting structure including means mounting said roller means for rotation on an axis parallel to said idling rollers and disposed above the array of said rollers, for rolling engagement of the roller means with the upper surface of a plate disposed on said rollers, stationary structure disposed above the array of rollers and adjacent said supporting structure, a pivot for pivotally mounting said supporting structure on said stationary structure to swing about a vertical axis, adjustable stop means associated with said stationary structure and engaging the supporting structure, to retain the latter in a selected angular position relative to said pivot, fluid-pressure energized means engaging the supporting structure for urging the roller means against the plate on the rollers, and driving means carried by the supporting structure for turning the roller means to advance the plate along the path.

4. In apparatus for advancing plate material and the like along a path which has a plurality of roller means idling on axes extending transverse of the path for rolling travel of a plate, in combination, a platform, resiliently-tired roller means, bearing means carried by the platform and mounting the roller means for rotation below the platform, driving means carried on the platform and having driving connection to the roller means to turn the same, stationary supporting means adapted to be disposed over the roller path, means pivotally mounting said platform to said supporting means, so that the platform is disposed over the path for rolling engagement of the roller means with a plate carried on the path, said pivotal mounting means providing swinging adjustment of the platform on a vertical axis, and stop means extending from said stationary supporting means and comprising adjustable members adapted to engage opposite sides of the platform, for holding the latter in a selected position of angular adjustment about the aforesaid vertical axis.

5. Apparatus as described in claim 4, which includes fluid-pressure energized means connected at one end to the stationary supporting structure and connected at the other end to the platform at a locality horizontally spaced from the aforesaid vertical axis of the pivoting means in a direction lengthwise of the aforesaid path, for urging the platform and roller means downwardly to maintain the roller means in rolling engagement with a plate supported on the path.

6. In apparatus for advancing rigid plate material and the like, in combination, an array of spaced, parallel idling rollers adapted to support rigid, heavy, metallic plates having a predetermined width, said idler rollers providing a pathway of substantially said width, driving roller means comprising not more than a small number of rollers, said driving roller means having a total transverse axial dimension which is only a small fraction of the aforesaid width, supporting structure including means mounting said roller means for rotation on an axis parallel to said idling rollers and disposed centrally of the transverse dimension of said pathway above the array of said rollers, and means for driving said roller means, to transmit advancing force thereby to the plate.

7. Apparatus as described in claim 6, which includes fluid-pressure energized means engaging the supporting structure for relievably urging the roller means toward said idler rollers and in contact with the plate.

8. Apparatus as described in claim 6, which includes adjustable positioning means for the roller means, including means pivotally mounting the supporting structure on a vertical axis and adjustable retaining means for the supporting structure, for selectably limiting the angular position of the roller means relative to said vertical axis.

FREDERIC M. DARNER.
ROY E. BRAKEMAN.

REFERENCES CITED

The following references are of record in the file of this patent:

UNITED STATES PATENTS

| Number | Name | Date |
| --- | --- | --- |
| 182,105 | Covert | Sept. 12, 1876 |
| 711,947 | Dittbenner | Oct. 28, 1902 |
| 902,308 | Lovett | Oct. 27, 1908 |
| 1,590,611 | Wright et al. | June 29, 1926 |
| 2,012,715 | Boone | Aug. 27, 1935 |
| 2,453,339 | Petterson | Nov. 9, 1948 |
| 2,571,942 | Properzi | Oct. 16, 1951 |